US008012522B2

(12) United States Patent
Ornelaz, Jr.

(10) Patent No.: US 8,012,522 B2
(45) Date of Patent: Sep. 6, 2011

(54) METHOD AND APPARATUS FOR VACUUM FORMING CONTOURED EDIBLE PIECES

(75) Inventor: Richard D. Ornelaz, Jr., Easton, PA (US)

(73) Assignee: Mars, Incorporated, McLean, VA (US)

( * ) Notice: Subject to any disclaimer, the term of this patent is extended or adjusted under 35 U.S.C. 154(b) by 879 days.

(21) Appl. No.: 11/353,642

(22) Filed: Feb. 13, 2006

(65) Prior Publication Data

US 2006/0182856 A1    Aug. 17, 2006

Related U.S. Application Data

(60) Provisional application No. 60/652,484, filed on Feb. 11, 2005.

(51) Int. Cl.
*A21D 13/00* (2006.01)
(52) U.S. Cl. ......... 426/389; 426/512; 426/515; 426/383
(58) Field of Classification Search ............... 426/125, 426/388, 302, 306, 307, 446, 447, 448, 516, 426/512, 389, 515, 383; 164/170
See application file for complete search history.

(56) References Cited

U.S. PATENT DOCUMENTS

| | | | | |
|---|---|---|---|---|
| 2,425,431 A | * | 8/1947 | Le Vangie | 426/103 |
| 2,448,786 A | * | 9/1948 | Faxon | 425/134 |
| 2,813,033 A | * | 11/1957 | Schneider | 426/392 |
| 4,369,200 A | * | 1/1983 | Iwao et al. | 426/104 |
| 5,902,621 A | * | 5/1999 | Beckett et al. | 426/279 |
| 6,156,531 A | * | 12/2000 | Pathak et al. | 435/40.5 |
| 6,165,531 A | * | 12/2000 | Harding et al. | 426/512 |
| 6,261,620 B1 | * | 7/2001 | Leadbeater | 426/515 |
| 6,303,171 B1 | | 10/2001 | Van Dyck et al. | |
| 6,592,923 B2 | * | 7/2003 | Chandler et al. | 426/512 |
| 7,144,594 B2 | * | 12/2006 | Woodhouse et al. | 426/383 |
| 2001/0041205 A1 | * | 11/2001 | Suttle et al. | 426/512 |
| 2002/0034573 A1 | * | 3/2002 | McNeel et al. | 426/549 |
| 2004/0213878 A1 | * | 10/2004 | Woodhouse et al. | 426/383 |
| 2006/0210672 A1 | | 9/2006 | Suttle et al. | |

FOREIGN PATENT DOCUMENTS

| | | | |
|---|---|---|---|
| DE | 3129892 | | 6/1982 |
| EP | 0548 814 | * | 6/1993 |
| EP | 0 611 639 | * | 8/1994 |
| FR | 1128927 | | 1/1957 |
| JP | 59120051 A | * | 7/1984 |
| WO | 2004/002229 | * | 1/2004 |

OTHER PUBLICATIONS

Orloski, A., Unfinished business, Packaging World [online], Feb. 2004, [retrieved on Nov. 15, 2010]. Retrieved from the Internet:<URL: http://www.packworld.com/news-17113>.*

(Continued)

*Primary Examiner* — Rena L Dye
*Assistant Examiner* — Chaim Smith
(74) *Attorney, Agent, or Firm* — Fitzpatrick, Cella, Harper & Scinto

(57) ABSTRACT

The described apparatus and method enable the production of thin edible products having complex contoured shapes that cannot be made using conventional molding technology. In particular, chocolates having detailed surface topology can be made utilizing a pliable substrate and a vacuum mold. The process may be made substantially continuous.

13 Claims, 4 Drawing Sheets

OTHER PUBLICATIONS

Swoops candy, The Hershey Company, [online] Oct. 2006, [retrieved on Nov. 11, 2010]. Retrieved from the Internet:< URL:http://web.archive.org/web/20061029031035/www.hersheys.com/products/details/swoops.asp>.*

Recipes and Baking Tips, Ghirardelli Chocolate [on line], Feb. 2003, [retrieved on Nov. 16, 2010]. Retrieved from the Internet:<URL: http:web.archive.org/web/200302221.30353/www.ghirardelli.com/tempering.cfm>.*

Harbecke, Paul Dr., "The Creation and Manufacture of a Chocolate Mould", 39th P.M.C.A. Production Conference, pp. 91-93 (1985).

* cited by examiner

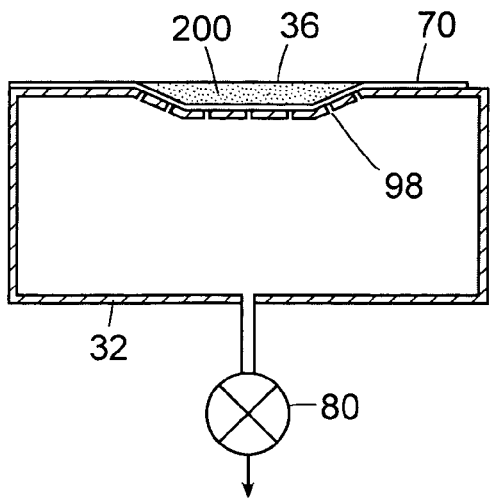
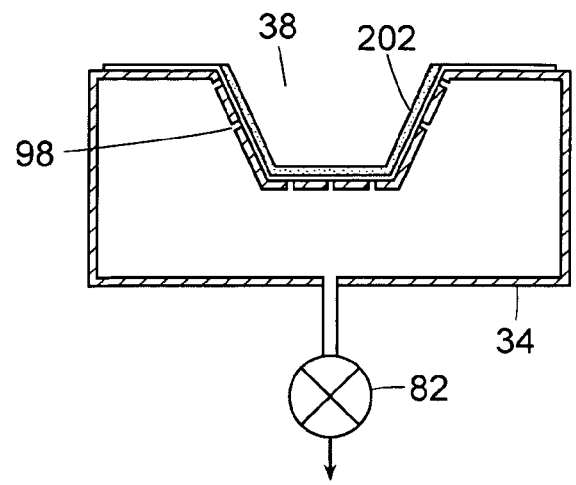
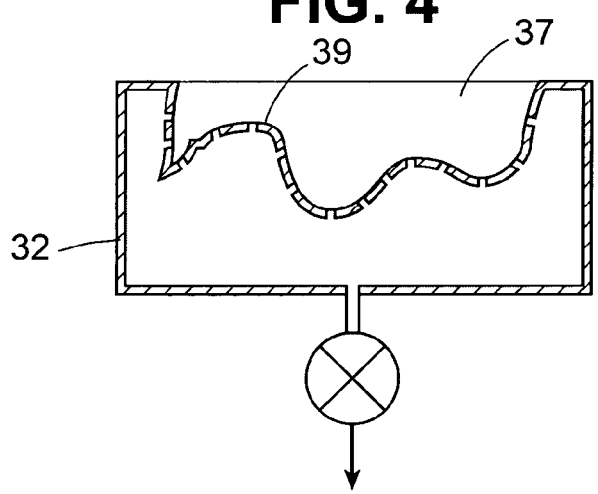
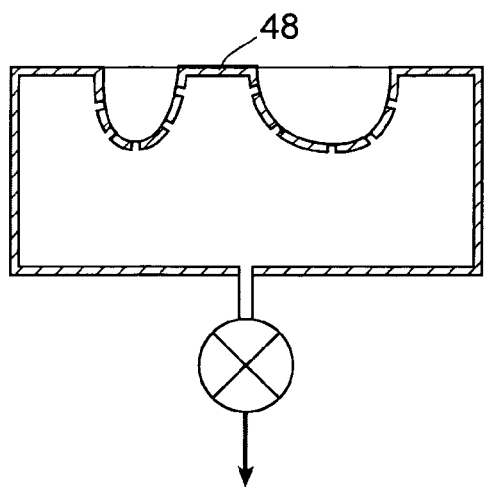
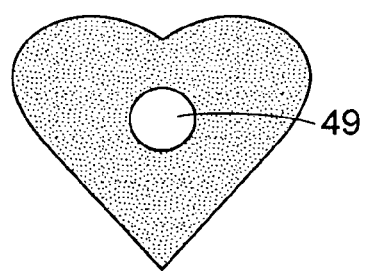

METHOD AND APPARATUS FOR VACUUM FORMING CONTOURED EDIBLE PIECES

This application claims the benefit of priority of U.S. Provisional Application No. 60/652,484, filed Feb. 11, 2005, which is incorporated by reference.

BACKGROUND OF THE INVENTION

1. Field of the Invention

The invention relates to methods of forming thin edible pieces, and in particular ultra thin edible pieces having novel contoured surfaces.

2. Description of the Related Art

The manufacture of thin edible pieces imposes significant technical constraints and challenges. Molding techniques and apparatus, such as those conventionally used for making molded chocolate products, place significant limitations on the product that may be obtained. For example, thin chocolate pieces cannot be molded using conventional techniques because demolding requires the mold to be turned over, and sometimes pounded, to release the solidified chocolate. Thin pieces lack the necessary weight relative to surface area to fall out of their own accord, and contacting the thin pieces with a removal member would likely break them.

The constraints of mold design also limit the configuration of the molded products in other ways. Molded products usually have flat backs, as the molded material fills, and then sits in, the mold. Further, draft angles of the mold (also called release angles) must be at least about 7 degrees, preferably 8 to 10 degrees or greater to prevent pieces from becoming stuck in the mold. It is also very difficult to obtain a piece having sharp angles using conventional mold design, as air may be trapped in the recesses, making it difficult to remove the piece. See, e.g., P. Harbecke, *The Creation and Manufacture of a Chocolate Mold*, $39^{th}$ P.M.C.A. Production Conference (1985).

Working by hand with chocolate (i.e., not in the context of making a manufactured confectionery product) chefs have been able to use the expedient of adding extenders, typically large amounts of corn syrup or other carbohydrate syrup, to allow the chocolate to be worked in a plastic state for a relatively long period of time before it sets. However, these items are for display, and are only rarely eaten, as the additives deleteriously effect the taste or texture of the chocolate product, which after initially attaining a fudge-like consistency allowing the chocolate to be worked, quickly becomes dry and brittle. Thus, there continues to be a need for techniques and apparatus for forming thin chocolate products having complex shapes which are made out of chocolate without using extenders.

U.S. Pat. No. 6,303,171 B1 describes a method and device for producing thin pieces of chocolate having curved surfaces. The apparatus comprises a flexible forming belt on which slices of chocolate are deposited. The flexible belt is passed through a trough having narrower width than the belt, forcing the sides of the belt to bend upwards and imparting curvature to the slice. The belt and slice are passed through a cooling tunnel in this position, to form solidified curved chocolate slices. A flexible, continuous, forming substrate, like the flexible belt described in U.S. Pat. No. 6,303,171 B1, can hold only a limited number of stable forming positions while it is conveyed through the cooling tunnel. Consequently, the surface contours of the pieces that can be manufactured with that apparatus are limited as a practical matter to simple bends. Moreover, it would be desirable to manufacture contoured chocolate pieces even thinner than those disclosed in the prior art.

Thus, there continues to be a need in the art for processes and apparatus that can be used to form thin edible pieces, and for methods of forming ultra thin edible pieces into complex shapes. There is a particular need for such processes and apparatus that can be used to manufacture and shape ultra thin chocolate pieces, even using Standard of Identity chocolate that has not been adulterated with extenders.

In U.S. Provisional application No. 60/652,485, incorporated herein by reference in its entirety, a method of making thin chocolate pieces using belt forming technology is described. The described method and apparatus can be used to form thin plastic blanks of chocolate or other edibles, which may then be used in connection with the forming technology according to the present invention.

SUMMARY OF THE INVENTION

In one aspect, the invention is a method of forming contoured edible pieces, comprising the steps of: depositing a layer of edible starting material on a pliable substrate; placing the pliable substrate and the layer of edible starting material over a vacuum mold having a contour; applying a pressure differential to the vacuum mold so that the pliable substrate and the layer of edible starting material conform to the contour of the vacuum mold; cooling to solidify the edible starting material to form a contoured edible piece; and removing the contoured edible piece from the vacuum mold.

In another aspect, the invention is a corresponding apparatus for forming a contoured edible piece, comprising: an edible starting material depositor; a pliable substrate; and a vacuum mold having a contour and having at least one evacuation opening; a conveyor positioning the edible starting material and the pliable substrate over the vacuum mold; and an adjustable source of pressure connected to the evacuation opening in the vacuum mold adapted to conform the edible starting material to the contour of the vacuum mold.

In preferred embodiments, the apparatus comprises two vacuum molds. The first vacuum mold is a depositing mold having a cavity with at least one evacuation opening. The second vacuum mold is a forming mold having a cavity with a contoured surface and having at least one evacuation opening in the surface. The corresponding method involves depositing a layer of edible starting material on a pliable substrate over the depositing mold and applying a pressure differential to the at least one evacuation opening, so that the pliable substrate and the layer of edible starting material conform to the depositing mold cavity to form a starting blank. Thereafter the starting blank and the pliable substrate are placed on the forming mold and a pressure differential is applied to the forming mold so that the pliable substrate and starting blank conform to the contoured surface of the forming mold cavity to form a finished edible piece.

The products made according to the method and/or using the apparatus described herein may be contoured on opposing surfaces, i.e., they do not have to be flat-backed like most molded chocolates. Using the methods and/or apparatus described herein, it is possible to form ultra thin contoured chocolate pieces, i.e., chocolate pieces less than 1.00 mm in thickness, having complex contours

BRIEF DESCRIPTION OF THE FIGURES

FIG. 3a schematically depicts a depositing mold according to an embodiment of the invention.

FIG. 3b schematically depicts a forming mold according to an embodiment of the invention.

FIG. 4 schematically depicts a variable thickness depositing mold according to an embodiment of the invention.

FIG. 4a depicts a depositing mold for forming a molded blank or molded piece having a hole according to an embodiment of the invention.

FIG. 4b depicts a molded piece having a hole according to an embodiment of the invention.

DETAILED DESCRIPTION OF THE PREFERRED EMBODIMENTS

Figure 7A:
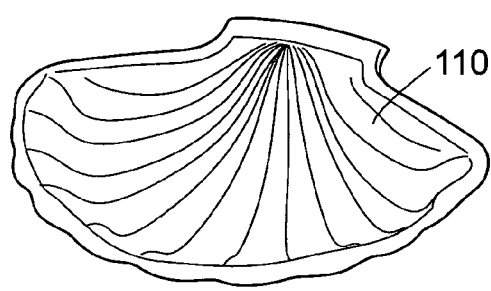
FIG. 7a depicts an inner contoured surface of a molded piece according to an embodiment of the invention.
Figure 7B:
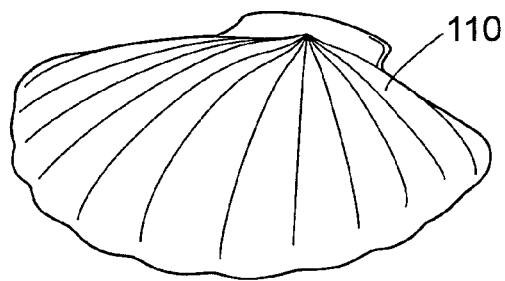
FIG. 7b depicts an outer contoured surface of a molded piece according to an embodiment of the invention.

The invention is directed to forming contoured edible pieces. "Contoured" means that the surface has a three-dimensional feature or bend. Opposite sides of a contoured piece according to the invention are shown in FIG. 7a and FIG. 7b. Whereas a conventional molded item typically has a flat inner surface (i.e., the side facing away from the mold surface), the present invention allows for thin, very thin and ultra thin pieces having contours 110 on the inner surface and the outer surface (i.e., the side facing the mold surface during molding).

As used herein, "thin" is defined as having a thickness of about 2.00 mm to about 4.00 mm. "Very thin" is defined as having a thickness in a range of about 1.0 mm to about 2.00 mm. "Ultra thin" is defined as having a thickness less than about 1.0 mm. Edible pieces have been manufactured with the methods and apparatus described herein having a thickness in a range of about 4 mm to less than 1 mm. Preferably pieces according to the invention are ultra thin, having a substantially uniform ultra thin thickness. Preferably the thickness is in a range of about 0.40 mm to less than about 1.00 mm. In embodiments, the thickness is in a range of about 0.40 mm to about 0.80 mm. In other embodiments, the products according to the invention may be made having a thickness between about 0.40 mm to about 0.60 mm The edible starting material should be capable of being handled in a liquid or plastic state, which means that the material must exhibit shear flow. Further, the material must be capable of being solidified by cooling into a finished piece, and should exhibit some adherence to the pliable substrate used. The preferred materials are fat based systems wherein the fats in the fat based system tend to be solid at room temperature. Examples of suitable edible starting material include chocolate and compound coatings.

A preferred edible starting material is chocolate. The term "chocolate" is intended to refer to all chocolate or chocolate-like compositions with a fat phase or fat-like composition. In the United States, chocolate is subject to a standard of identity established by the U.S. Food and Drug Administration (FDA) under the Federal Food, Drug and Cosmetic Act. As used herein, the term "chocolate" is intended to include chocolates with compositions conforming to the U.S. Standards Of Identity and compositions not conforming to the U.S. Standards Of Identity, including dark chocolate, baking chocolate, milk chocolate, sweet chocolate, semi-sweet chocolate, buttermilk chocolate, skim-milk chocolate, mixed dairy product chocolate, low fat chocolate, white chocolate, aerated chocolates, compound coatings, and chocolate-like compositions, unless specifically identified otherwise.

Chocolate usually contains cocoa butter, chocolate liquor, sugar or other nutritive carbohydrate sweetener and a lecithin emulsifier. Chocolate may also contain milk or milk fat. Non-standard chocolates result when, for example, the nutritive carbohydrate sweetener is replaced partially or completely; or when the cocoa butter or milk fat are replaced partially or completely; or when components that have flavors that imitate milk, butter or chocolate are added or other additions or deletions in formula are made outside the FDA standards of identify of chocolate or combinations thereof.

A "vacuum mold" is a member to which a pressure differential can be applied so that liquid edible starting material on a pliable substrate contacting the mold will conform to the shape of the mold. The mold may be concave or convex and may have positive and negative features. In preferred embodiments, a vacuum mold comprises a cavity which can be substantially closed off by a pliable substrate positioned over the opening thereof. A layer of edible starting material is deposited on the substrate. Negative pressure may be generated in the cavity by evacuating air through at least one small opening in the cavity to pull the substrate and the layer of edible starting material into the mold. The opening(s) may be one or more small holes, slits or the like. It is possible that positive pressure may be applied to push the edible starting material and the pliable substrate onto the mold surface.

One type of vacuum mold which may be used in connection with the invention is a "depositing mold". The depositing mold may be used to make a starting blank having an appropriate size and thickness to be formed into a finished piece. A second type of vacuum mold which may be used in connection with the invention is a "forming mold" which is used to make a finished contoured piece. A forming mold typically has a deeper, more complex cavity than a depositing mold.

The depositing mold and the forming mold both comprise a cavity over which the pliable substrate can be positioned. Preferably, the pliable substrate substantially closes off the cavity to define a space that can be evacuated. The pliable substrate and the layer of edible starting material are both positioned over the opening of the cavity. Negative pressure may be generated in the cavity by evacuating air through at least one small opening in the cavity to pull the substrate and the layer of edible starting material into the mold. However, as used herein, unless specified, "pressure" means positive or negative pressure.

As used herein "conveyor" simply refers to the support for the pliable substrate. In a non-continuous embodiment, the conveyor is movable by hand, to be placed on or taken off the forming or depositing mold. In a continuous apparatus, a conveyor may carry the pliable substrate from station to station.

The phrases "continuous" and "continuously conveyed" in the context of the pliable substrate webbing refers to a webbing which is a continuous piece throughout the process of depositing the edible starting material, forming the blank, molding the contoured edible piece and demolding. Thus, the "continuous" webbing does not have to be (and typically is not) an endless belt to be considered continuous. The continuous webbing does not have to be any particular length, provided that one portion of the webbing can be conveyed through all the process steps. For example, the continuous webbing may be unspooled from an unwind roll, travel a substrate path, and then be taken up by a rewind roll. The substrate material could be reused or (typically) discarded. In operation, the continuous webbing may be stopped and started.

Specifying that apparatus elements or steps are in a "process line", absent further amplification, does not imply that the said apparatus elements or process steps are conducted in the stated order.

Figure 1:
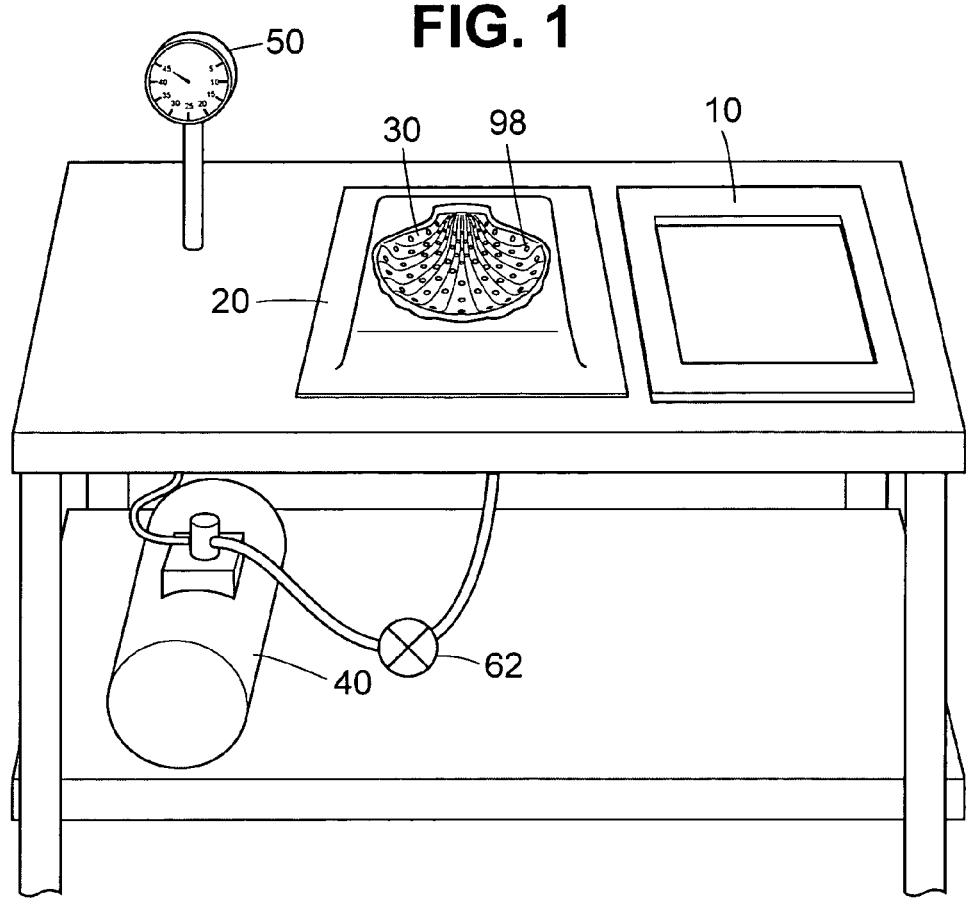
FIG. 1 depicts components of the invention in a bench-top configuration.

An exemplary arrangement is depicted schematically in FIG. 1. In FIG. 1 the conveyor comprises frame 10 on which the pliable substrate material is loaded. Mold 20 has a cavity 30, with evacuation holes 98 therein connected to a vacuum pump 40. Valve 62 is used to regulate the pressure applied to the mold cavity 30, which may be monitored using gauge 50. Other suitable apparatus elements and instrumentation (not shown) may be added to help generate, monitor and control the pressure applied to the mold cavity, as would be understood to one of ordinary skill in the art.

Figure 2:
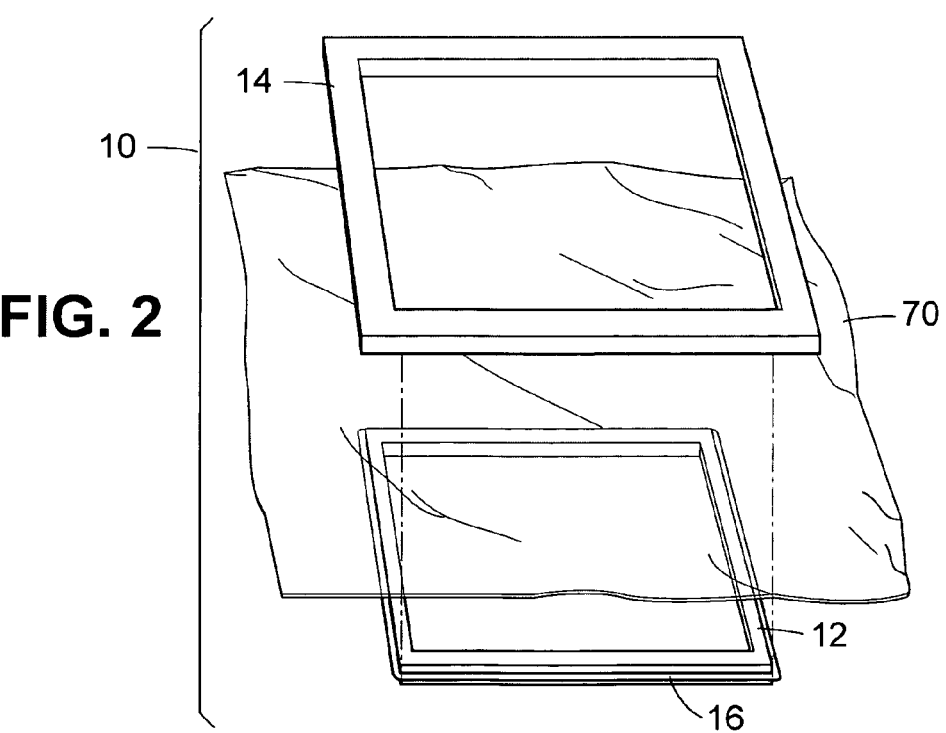
FIG. 2 depicts a conveyor comprising an inner frame and an outer frame which may hold a substrate according to an embodiment of the invention.

In embodiments, the frame 10 is loaded with the pliable substrate material 70, such as a clear plastic wrap, commonly referred to as "cling wrap", and stretched. For this purpose, the pliable substrate may be supported on a conveyor comprising a support member and a stretching member. As shown in FIG. 2, the stretching member 14 engages with the support member 12 to stretch the substrate 70. The apparatus is loaded by laying an inner frame 12 onto a flat surface. A sheet of plastic substrate 70 is placed over the inner frame. The substrate extends about an inch past the perimeter of the inner frame on all sides, although the amount of excess is not critical. Next, the outer frame 14 is aligned over the inner frame 12 and pressed onto the perimeter of the inner frame. The plastic substrate 70 is secured by the O-ring 16 around the perimeter of the inner frame, which is compressed between the inner and outer frame as they engage one another. The action of engaging the two frame pieces together pulls the plastic substrate tight in all directions. In addition, tooling and machinery can be used to help hold and position the film, insuring a taut, loaded film.

Other frame arrangements, which do not include engaging inner and outer frames separated by an O-ring are within the scope of the invention. For example, a frame having a small groove around the perimeter may be used. Using window screening rubber tubing and a window screening tool, one side of the plastic wrap may be carefully pushed into the groove around the perimeter, taking care not to wrinkle the plastic wrap. This step is repeated until all four sides of the plastic wrap are locked into the frame by the screening rubber tubing. The excess plastic wrap around the outside perimeter of the frame may be trimmed off, for example with a pair of scissors.

Prior to depositing the edible starting material, e.g., chocolate, on the pliable substrate, an image may be deposited on the substrate, which image can then be transferred to the surface of the molded piece. For example, an image in edible ink may be applied to the substrate by offset printing or preferably by ink jet printing. Vacuum molding can be performed before the ink image is completely dry, or the surface condition of the substrate may be such as to extract the image from the pliable substrate.

The pliable substrate material is not particularly limited, and several latex and cellophane plastic materials known in the art are suitable. Polyvinylchloride (PVC), polypropylene and polyethylene have been successfully used with the method and apparatus. The pliable substrate material should exhibit high elongation and/or high elongation before rupture. It is the ability of the material to elongate before rupture that enables a deeper draw into the forming mold. The thickness of the substrate may influence the elongation of the substrate. Thus it may be possible to draw the edible starting material blank more deeply into the forming mold using a thicker substrate.

Different edible starting materials may be codeposited to form a product having a heterogeneous appearance on the surface, such as a swirl. Different edible materials (white chocolate, dark chocolate and milk chocolate, for example) may also be deposited one after the other, so that the finished piece has an inner surface and outer surface comprised of different edible materials. In general, "depositing" is used herein to include both co-depositing and plural steps of depositing edible starting material.

A depositor comprises a source of edible starting material, such as chocolate, in a liquid state, an opening to direct the edible starting material onto the substrate, and a metering device such as a pump to control the flow of edible starting material through the opening onto the substrate. Suitable depositors are known in the art, and on a small scale, edible starting material may be applied to the substrate by hand.

In preferred embodiments, an edible starting material blank is formed prior to placing the edible starting material on the forming mold. A chocolate forming blank is preferably formed to eliminate flashing (excess chocolate) when the contoured piece is produced on the forming mold. This may be accomplished, for example, using a mask or a depositing mold.

In preferred embodiments, the invention utilizes a depositing mold to form a starting blank. Forming of the contoured piece is thereafter completed in a separate forming mold, typically having a deeper recess As shown in FIG. 3a, depositing mold 32 is a vacuum mold, having a relatively shallow cavity 36. The cavity sets the thickness of a chocolate forming blank 200. To use the depositing mold 32, pliable substrate 70 is placed on the depositing mold frame and air is evacuated through outlet 80 so that the plastic substrate conforms to the contours of the depositing mould to form blank 200. As shown in FIG. 3b, forming mold 34 comprises a forming cavity 38. The cavity 36 of the depositing mold is shallow compared to the forming mold cavity 38 used to form a finished contoured piece 202. The blank 200 is placed over forming mold 34 and air is evacuated through outlet 82 to form the finished piece 202. It is not necessary for the substrate or edible starting material to be above the vacuum mold(s) in order to be "over" the vacuum mold(s). The term "over", in this context, merely implies that a portion of the mold is covered by the substrate and the edible starting material.

As shown in FIG. 4, the depositing mold 32 can have variable contours 39, thereby resulting in a variable thickness deposited blank. This allows for the thickness of the final piece to be controlled. For example, a deep drawn piece will be thinner at the bottom of the piece than the top if a constant thickness of chocolate is deposited. However, using a depositing mold, the thickness of the deposited layer can be modified so that the parts that are drawn the deepest begin with a thicker layer of chocolate, resulting in a uniform final piece.

Using a depositing mold, it is possible to make a chocolate blank having internal holes, resulting in the finished contoured piece having internal holes. As shown in FIG. 4a and FIG. 4b. When depositing mold contour 48 rises to the top surface, the chocolate will be scraped clean, forming an internal hole 49 in the final piece.

Figure 5:
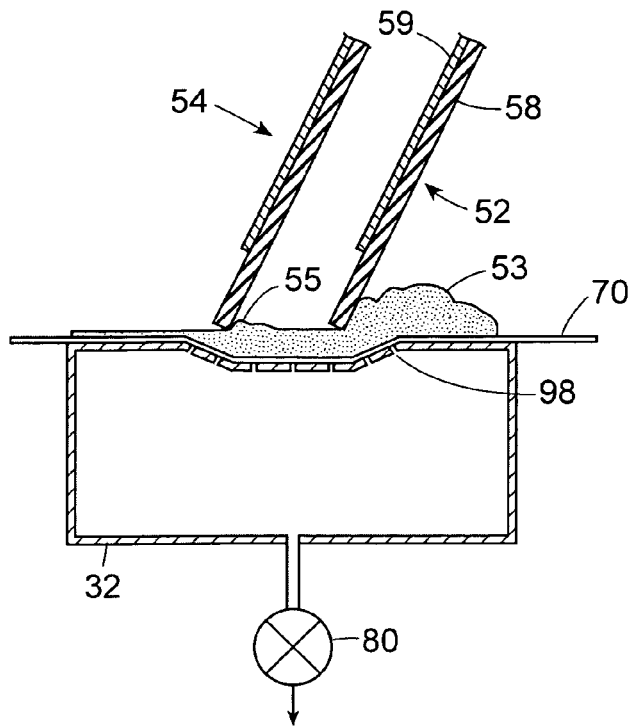
FIG. 5 schematically depicts a scraper configuration according to an embodiment of the invention.

As shown in FIG. 5, after chocolate (or other starting material) is deposited on the plastic substrate, the chocolate is scraped across the plastic substrate using at least one scraper 52. From the scraping action, the chocolate fills in the profiles and contours of the vacuum mold. Finally, the vacuum is turned off, allowing the frame to be removed and taken to the next process step. Two or more scrapers may be used to level the chocolate. The primary scraper 52 moves the bulk of the chocolate 53, and the following scraper 54 moves the excess chocolate 55, leaving a crisply defined chocolate pattern or blank, which is typically a two-dimensional projection of the three-dimensional piece formed on the forming mold, but in some instances may be a finished contoured piece.

As described above, the depositing mold is effective to produce starting blanks for forming more complex contoured pieces by vacuum molding. However, a mask or other method of preparing the chocolate for vacuum forming may also be used.

A mask is a thin piece of material, such as plastic or metal, that has an outline cut into it, and which is the same thickness as the desired thickness of the piece. A frame, loaded with a sheet of plastic wrap, is placed on to the table. A block of material, referred to as the frame support plate, is placed into the middle of the frame, underneath the plastic wrap. This plate is cut to the same thickness and inner dimension of the frame and will support the plastic wrap during the scraping operation. The support plate prevents the pliable substrate from sagging in the middle, and permits the formation of a uniform chocolate layer. The mask is placed on top of the plastic wrap. To form the chocolate starting blank, a scraper is dragged across the mask to level the chocolate. If a mask is used, the scraper will not contact the pliable substrate. If a depositing mold is used, care must be taken to ensure that the scraper does not damage the substrate. For this purpose, as shown in FIG. 5, a rubber scraper 58 may be used, stiffened with a rigid backing 59 of metal, for example.

To prevent the rubber material of the scraper from clinging to the substrate material, which may cause tears to develop and not allow the scraper to smoothly glide across the top surface of the plastic substrate, the rubber material may be first primed with chocolate all along the area of contact with the plastic substrate. The scraper in effect glides on the thin layer of chocolate primer. Generally, such priming only needs to happen once, since the chocolate that is being scraped across the top surface continually primes the scraper contact surface. The material of the scraper is not particularly limited, with clear silicone rubber having a thickness of about ⅛ inch being preferred at present.

Alternatively, if a mask is used, a metal scraper may be used to scrape the chocolate across the surface of the mask. The mask is carefully removed and put aside. The result is a pool of chocolate that is a two dimensional projection of the final piece. Whatever system is used to form the desired amount of chocolate on the pliable substrate and level the surface thereof, the conveyor with the substrate and a thin layer of chocolate is removed from the support plate and the conveyor is placed onto the forming mold.

Chocolate used with the depositing mold, or with a mask for that matter, is preferably tempered chocolate having a temperature in a range of 26° C. to 30° C. to maintain temper. The level of temper and type of chocolate determine the chocolate temperature, as is recognized by those of ordinary skill in the art of chocolate molding. The layer of starting material may have a thickness ranging from about 0.04 mm to about 4 mm, preferably about 0.4 mm to about 1.0 mm.

The thin layer of chocolate is aligned with the mold below. In the case of the shell shape shown in FIG. 7a and FIG. 7b, the chocolate shell outline on the plastic wrap is visually aligned with the perimeter of the shell mold below. The vacuum pump is actuated and air is evacuated from the mold and the plastic wrap and chocolate stretch into the shell mold below. Preferably from 20 inches Hg to 26 inches of Hg of vacuum are generated by the vacuum pump to produce detailed parts. Referring to FIG. 3b, a contoured piece 202 conforms to the relatively deep cavity 38 of the forming mold. If desired, a fan is turned on to blow air onto the shell mold for 2 minutes. The vacuum pump is then turned off and the vacuum decreases to zero.

The environment in the vicinity of the forming mold may be controlled by providing a suitable enclosure or partial enclosure and appropriate humidity and/or temperature controls. The relative humidity of the air in the vicinity of the forming mold should be such that the dew point of the ambient air is lower than the temperature of the tooling. By the same token, the temperature must not be so high as to detrimentally affect the process. Thus, if chocolate is used as the edible starting material, the temperature should not be so high that the chocolate loses its temper. Likewise the ambient temperature should not significantly compete with the chilling of the mold cavity.

The product is removed from the mold. The temperature of the chocolate is whatever ambient conditions are, typically 20° to 25° C. Thereafter, the chocolate piece is conditioned. Conditioning after making the product may be conducted in a range of about 10° C. to about 20° C., preferably about 12° C. to about 18° C. In a small manual batch, the samples may be placed in a refrigerator at 5° C. for 20 minutes.

To separate the chocolate and the plastic wrap, two methods are typically used. The first method is simply to peel the plastic from the chocolate piece by hand. This method is easily done, since the plastic does not strongly bond to the chocolate. Alternatively, the chocolate piece is placed back onto the shell mold with the plastic side in the mold and positive pressure is used to push the piece from the substrate. Rubber bands are used to secure the outer perimeter of the plastic wrap to the outside of the mold. The compressed air valve is turned to the on position. The regulator is adjusted to between 20 and 25 psi. The selector valve is switched to the compressed air position. The chocolate piece and plastic pop out of the mold. The plastic becomes convex, while the chocolate maintains it shape, therefore, separating the majority of the chocolate from the plastic wrap. The chocolate piece is easily picked off from the plastic wrap.

The finished chocolate piece has a detailed contoured surface as shown in FIG. 7a and FIG. 7b. Unlike a typical molded flat-back chocolate piece, the vacuum-molded piece has deep surface contour 110 on both sides.

Figure 8:
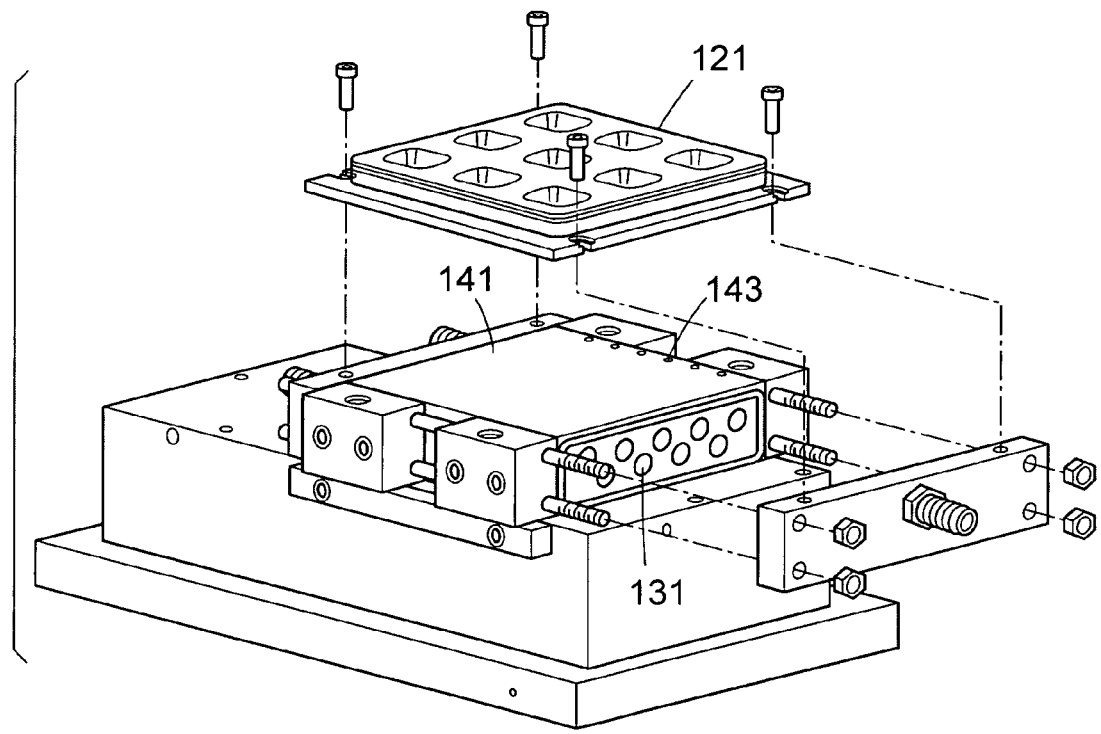
FIG. 8 depicts a thermally conductive forming mold with a cooling platen according to an embodiment of the invention.

In operation, if chocolate is the starting material, the chocolate is preferably exposed to a temperature in a range of about −20° C. to about 15° C. in the forming mold for a period of time in the range of about 5 seconds to about 600 seconds to form the finished piece. This temperature may be maintained using a cooling platen, as described in connection with FIG. 8.

Although it is possible, in some circumstances, to utilize the same vacuum mold as the depositing mold and the forming mold, it is preferred to utilize different vacuum molds because the process conditions for each step are different.

For depositing, the chocolate should be handled as a fluid, so that it can be pumped into the machine, so that excess material can be collected and reused, etc. For this purpose, the apparatus may be enclosed, allowing the ambient conditions to remain warm, preferably in a range of about 26° C. to about 40° C. This elevated temperature is to keep the chocolate in a liquid state. As deposited on the pliable substrate, the liquid chocolate preferably has a temperature in a range of about 25° C. to about 32° C.

For forming, additional liquid chocolate is generally not needed. The apparatus may be enclosed, but the conditions are cool and dry. The forming molds for the forming machine are chilled to rapidly set up the chocolate, maintaining a dew point below the temperature of the tooling is preferable to eliminating ice build-up. In the embodiment depicted in FIG. 8, the forming mold comprises a cooling platen 141, which is a plate having passageways 131 for cooling fluid. The mold tool 121 is fastened on top of the platen. The mold tool may be made of a solid piece of aluminum, or other good heat transfer material. The vacuum holes extend from the molding surface to the bottom of the tool and are generally made as small as practicable. Each vacuum hole is connected via a machined groove (not shown) to one or both sides of the tooling where the vacuum is pulled through vacuum holes 143 connected to a source of pressure. The bottom of the tool is ground flat to insure good contact with the cooling platen to insure good heat conduction. The coolant in the conduits preferably maintains a temperature in a range of about −20° C. to about 15° C. in the forming mold.

After being removed from the forming mold, the chocolate piece may be conditioned, preferably at a temperature of about 10° C. to about 20° C. for about 60 seconds to about 600 seconds to crystallize the chocolate.

Figure 6:
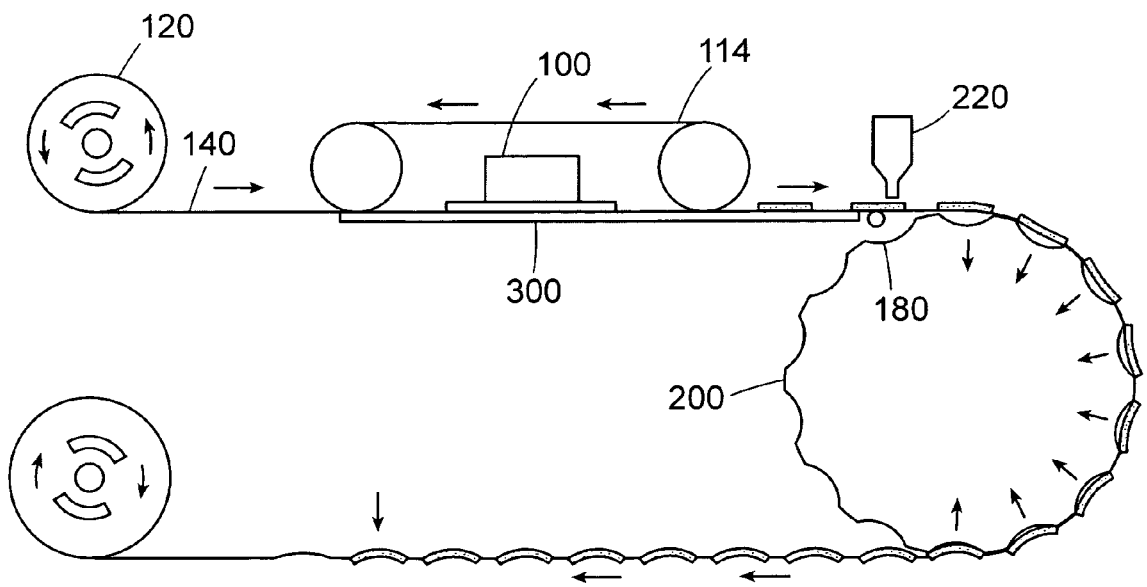
FIG. 6 depicts a configuration for continuous vacuum molding according to an embodiment of the invention.

A proposed apparatus for continuous operation of the method according to the invention is shown in FIG. 6. The vacuum forming of chocolate process begins by the deposition of tempered chocolate onto a thin, pliable substrate from the manifold 100. Next, a scraper mechanism (not shown) levels the chocolate, leaving a thin, uniform thickness of chocolate on the top of the pliable substrate. In the preferred embodiments, the resulting blank has a thickness of about 0.04 mm to about 1.00 mm. The pliable substrate material is unwound from a roll 120 and constitutes a continuous webbing of pliable substrate 140. The substrate is positioned beneath the mask, which is configured as a endless blank forming belt 114, whose purpose is to set the thickness of the chocolate layer and eliminate the flashing by allowing chocolate to be applied to only the areas to be vacuum formed. The mask has the cross section of the desired piece cut through it. Supporting the pliable substrate, underneath the manifold, is a platen 300, which may be adapted with a heater or cooler to condition the edible starting material deposited on the substrate. If desired, decoration may be provided on the pieces using printer 220, or as described above, printing could be performed on the substrate and transferred to the piece.

To maintain the temper of the chocolate, the chocolate is preferably deposited on the pliable substrate at a temperature in the range of 25° C. to about 32° C.

Although other configurations are possible, the vacuum mold 200 shown in FIG. 6 comprises a rotating body having a mold cavity 180 equipped to draw the edible starting material and the pliable substrate into the cavity 180. The air is evacuated from the mold and the chocolate and substrate stretch into the mold. The mold is held at an appropriate temperature in order to balance the time required for setting the chocolate shape and the time required to at least partially crystallize the piece after forming. Conduits (not shown) may be provided to supply a coolant fluid to the rotary mold to maintain the optimal temperature for molding. Although described in connection with making contoured chocolate pieces, it is contemplated that the continuous apparatus described may be used with edible starting materials other than chocolate.

For negative features, the substrate material is pulled into the mold by the force of the vacuum. By controlling the rate at which the substrate and the chocolate are drawn into the mold, the film is allowed to gradually form to the mold, which enables the film to be drawn into the mold more deeply. A valve 62 may be used to control the amount of air the vacuum pump can draw, so that the time to pull the substrate and chocolate into the mold varies in a range of less than 1 second to about 3 seconds.

To demold a negative feature, the substrate must move in the opposite direction of the forming vacuum. To accomplish this, either positive pressure can be applied to the substrate side, or a vacuum can be applied to the chocolate side (with the first being the preferred manner). When the appropriate pressure is applied, the substrate and chocolate will move up, but because the chocolate is rigid and the substrate is flexible the substrate will peel away from the chocolate, thereby demolding the chocolate piece.

For positive features, the substrate material is pulled onto the mold by the force of the vacuum. The rate at which the mold is forced into contact with a substrate arranged on a positive mold is important for avoiding rupture of the substrate. By controlling this rate, the substrate is allowed to gradually form around the tool and taller tools can be used. Forcing the tool too quickly into the plastic substrate can rupture the plastic film. The rate preferably varies from fractions of a second to about 3 seconds. The mechanism that forces the plastic substrate onto the mold or the mold into the plastic substrate is responsible for controlling the rate at which the two engage each other.

To demold a positive feature, the substrate must pulled from the inside of the positive feature. To accomplish this a vacuum can be applied to the substrate side. When a vacuum is applied, the substrate will move out of the feature, but because the chocolate is rigid and the substrate is flexible the substrate will peel away from the chocolate, therefore, demolding the chocolate piece.

Some molds will contain both negative and positive features. For these molds, both positive and negative pressure may be applied in order to release the chocolate part.

It is contemplated that halves of a completed part can be formed using the technology described herein. A process of joining molded chocolate parts is known in the art as "book molding". In the present context, this joining of parts may be done directly after the pieces are formed, when the pieces are still liquid or plastic. Alternatively, the joining may be done after the piece has solidified, but before it has fully crystallized. In yet another embodiment, the pieces may be allowed to crystallize, and the pieces are then reheated on the joining surfaces to soften and join the parts together.

Thin walled chocolate structures are conventionally filled with other confectionery material. As an extension of the vacuum forming techniques and apparatus described above, a thin walled structure made according to the invention is sufficiently robust (partially or fully crystallized) that a filling and/or inclusion may be deposited therein. To deposit the filling, conventional depositing techniques may be used, including (without limitation) single or multiple shot depositors, which inject layers of confectionary materials through the use of a single piston motion. The chocolate shells can be removed from the plastic substrate before or after depositing, although removing them after depositing may be preferable, since the shells are captured and located via the plastic substrate and frame.

Examples of suitable fillings and inclusions include, without limitation, additional chocolate to form a solid chocolate piece, or different chocolate types, peanut butter, nuts, caramel, nougat, creams, ganache, fruit fillings, dried fruits, grains (such as puffed rice, granola, and the like).

What is claimed is:

1. A method of forming a contoured edible piece comprising the steps of:
    forming a chocolate starting blank having a tempered chocolate layer on a pliable substrate, wherein the layer has a variable thickness;
    aligning the chocolate starting blank with a vacuum forming mold having a contour;
    applying a pressure differential to the vacuum mold such that the pliable substrate and the layer of chocolate conform to the vacuum mold contour to form a contoured chocolate edible piece having a surface contour; and
    removing the contoured chocolate edible piece from the vacuum mold;
    wherein the variable thickness of the chocolate starting blank provides a contoured chocolate edible piece having a substantially uniform wall thickness throughout the entire contoured edible piece.

2. A method of forming a contoured edible piece of claim 1 in which the chocolate starting blank is formed by depositing liquid chocolate into a depositing mold.

3. A method of forming a contoured edible piece of claim 1 in which the chocolate starting layer blank is formed using a mask.

4. A method of forming a contoured edible piece of claim 1 in which the chocolate starting blank is placed in the vacuum forming mold such that varying thicknesses of the blank correspond to contours in the removed edible piece.

5. A method of forming a contoured edible piece of claim 1 in which the edible piece has a thickness of up to about 4 mm.

6. A method of forming a contoured edible piece of claim 1 in which the edible piece has a thickness of less than 1 mm.

7. A method of forming a contoured edible piece of claim 1 in which an image is transferred to the surface of the edible piece.

8. A method of forming a contoured edible piece of claim 1 in which the chocolate starting blank contains a hole.

9. A method of forming a contoured edible piece of claim 2 in which a scraper is used to level the chocolate in the depositing mold.

10. A method of forming a contoured edible piece of claim 1 in which the starting chocolate layer is about 0.04 to about 4 mm.

11. A method of forming a contoured edible piece of claim 1 in which temperature of the chocolate in the starting blank is 25 to about 32° C.

12. A method of forming a contoured edible piece of claim 1 in which the chocolate edible piece removed from the forming mold is conditioned at a temperature of about 10 to about 20° C. for about 60 to about 600 seconds.

13. A method of forming a contoured edible piece of claim 1, further comprising joining the contoured edible piece removed from the vacuum mold with a second contoured edible piece.

* * * * *